June 4, 1940.　　　　　W. F. BOLDT　　　　2,203,042
VALVE MECHANISM FOR FLUID PRESSURE SYSTEMS
Filed Sept. 17, 1938　　　3 Sheets-Sheet 1

INVENTOR:
W. F. BOLDT
BY
E. E. Huffman
ATTORNEY

June 4, 1940.  W. F. BOLDT  2,203,042
VALVE MECHANISM FOR FLUID PRESSURE SYSTEMS
Filed Sept. 17, 1938  3 Sheets-Sheet 2
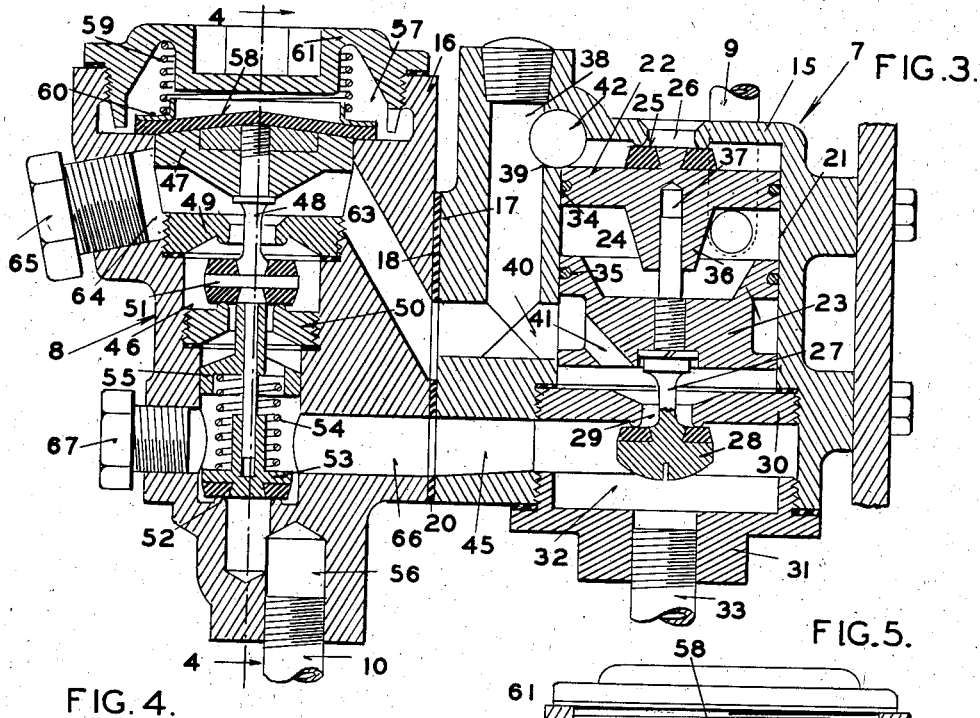
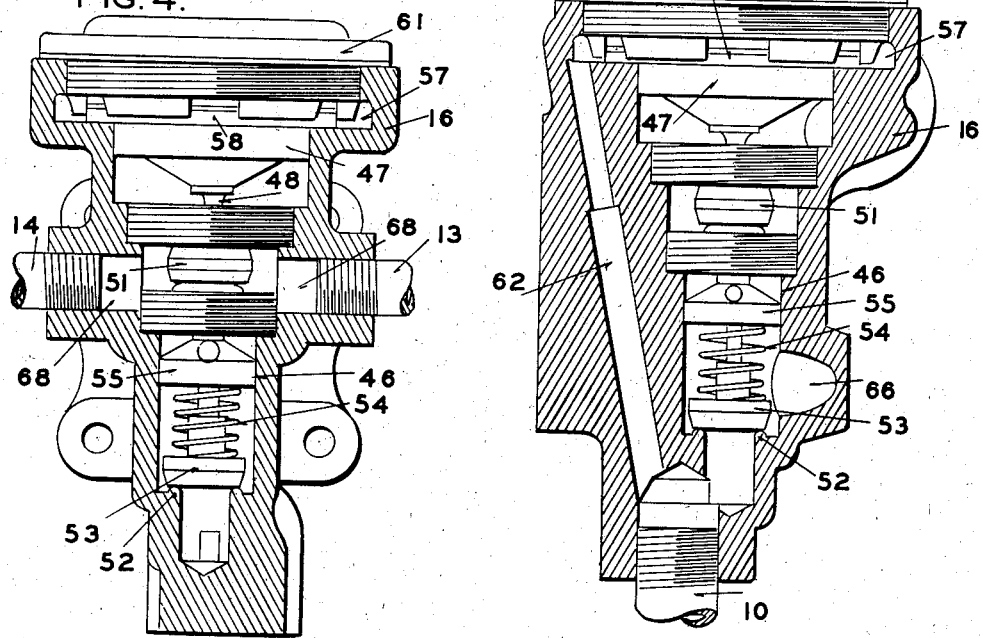
INVENTOR:
W. F. BOLDT
BY *E. E. Huffman*
ATTORNEY June 4, 1940.  W. F. BOLDT  2,203,042
VALVE MECHANISM FOR FLUID PRESSURE SYSTEMS
Filed Sept. 17, 1938  3 Sheets-Sheet 3

INVENTOR:
W. F. BOLDT
BY
ATTORNEY

Patented June 4, 1940

2,203,042

UNITED STATES PATENT OFFICE 2,203,042

VALVE MECHANISM FOR FLUID PRESSURE SYSTEMS

Werner F. Boldt, Clayton, Mo., assignor to Wagner Electric Corporation, St. Louis, Mo., a corporation of Delaware Application September 17, 1938, Serial No. 230,412

7 Claims. (Cl. 188—3)

My invention relates to valve mechanism for fluid pressure systems and more particularly to control valve mechanism for the trailer brakes of a fluid pressure braking system employed on a tractor-trailer vehicle.

One of the objects of my invention is to produce an improved valve mechanism for the trailer brakes which will permit the trailer brakes to be applied and released by the pressure of the fluid in the tractor brake lines and which will also cause the trailer brakes to be automatically applied in the event the trailer becomes uncoupled from the tractor.

Another object of my invention is to construct an improved combined relay valve mechanism and emergency control valve mechanism for a trailer system which will permit the trailer brakes to be actuated by fluid pressure stored in the trailer reservoir either during the normal service operation of the braking system or when the trailer becomes uncoupled from the tractor.

Still another object of my invention is to so construct the combined relay valve mechanism and the emergency control valve mechanism that either one may be employed in the trailer brake system independently of the other.

Figure 1:
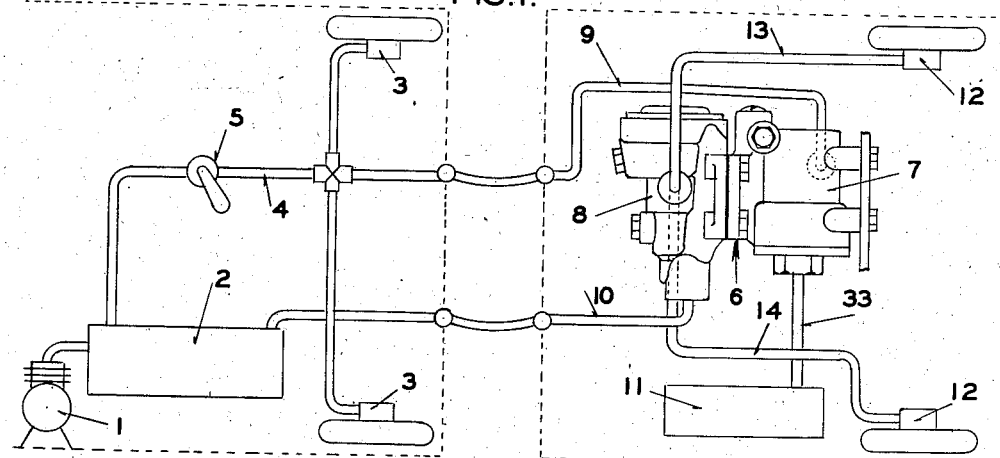
Figure 2:
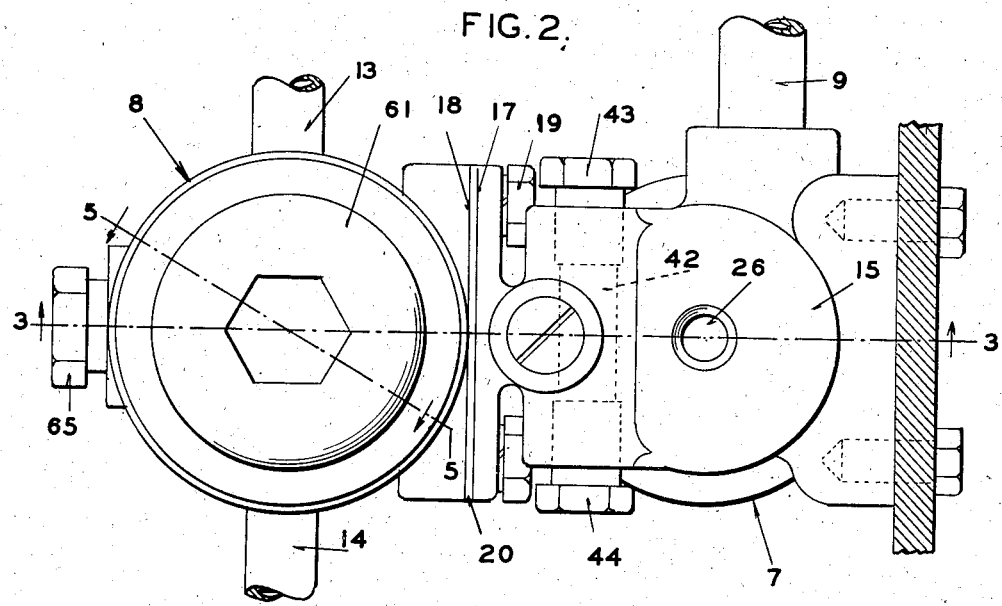
Figure 6:
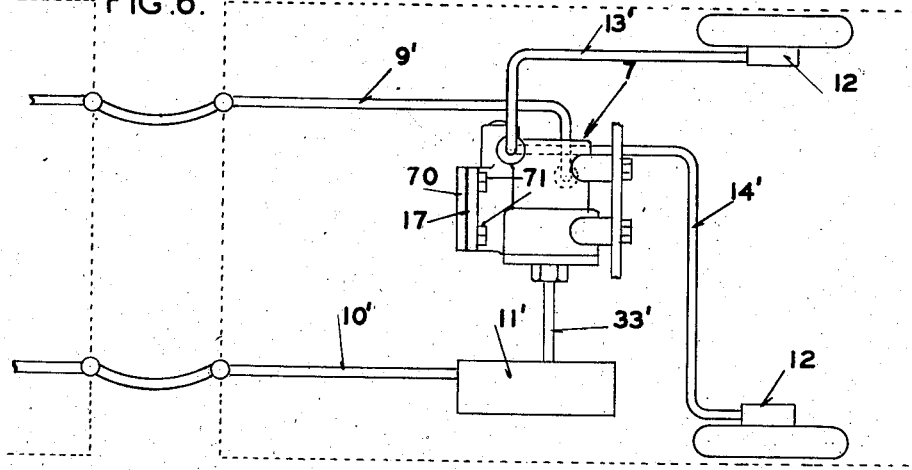
Figure 7:
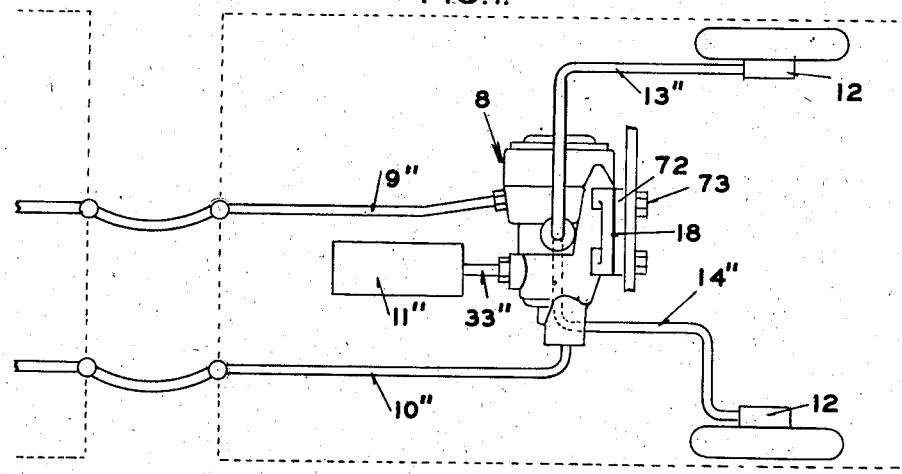

Other objects of my invention will become apparent from the following description taken in connection with the accompanying drawings in which Figure 1 is a schematic view of a tractor-trailer braking system having embodied therein my novel valve mechanism for controlling the trailer brakes; Figure 2 is an enlarged top view of the valve mechanism; Figure 3 is a cross-sectional view through the valve mechanism taken on the line 3—3 of Figure 2; Figure 4 is a cross-sectional view taken on the line 4—4 of Figure 3; Figure 5 is a cross-sectional view taken on the line 5—5 of Figure 2; Figure 6 is a schematic view of a trailer brake system showing how the relay valve mechanism is embodied therein when employed alone; and Figure 7 is a schematic view of a trailer brake system showing how the emergency valve mechanism is embodied therein when employed alone.

Referring to Figure 1, the tractor-trailer braking system in which my novel valve mechanism is employed comprises a source of pressure, as for example, the compressor 1 which supplies fluid under pressure to the main reservoir 2, both mounted upon the tractor vehicle. The tractor power cylinders 3 for actuating the brakes are connected to the main reservoir by suitable conduit 4 in which is interposed the main control valve 5 suitably positioned for operation by the operator of the vehicle.

The trailer vehicle has mounted thereon my improved control valve mechanism for the trailer brakes indicated generally by the reference character 6 and comprising the relay valve mechanism 7 for applying and releasing the trailer brakes and the emergency valve mechanism 8 for automatically applying the trailer brakes in the event the trailer becomes uncoupled from the tractor. The relay valve mechanism is connected by a conduit 9 with conduit 4 on the tractor braking system. There is also provided a conduit 10 which is commonly known as the emergency brake line for connecting the main reservoir 2 on the tractor with the auxiliary reservoir 11 on the trailer, the connection being through the valve mechanism in a manner to become apparent. The power cylinders 12 for actuating the trailer brakes are connected to the valve mechanism by means of conduits 13 and 14.

Referring to Figures 2 and 5, the relay valve mechanism 7 for applying and releasing the trailer brakes is incorporated within a casing 15 and the emergency valve mechanism 8 for applying the trailer brakes automatically in the event the trailer becomes uncoupled from the tractor is embodied in a casing 16. The valve casings 15 and 16 are formed with cooperating flat surfaces 17 and 18 which are adapted to be clamped together by means of bolts 19. A gasket 20 prevents any leakage between the cooperating surfaces.

The casing 15 is provided with a cylindrical chamber 21 within which are mounted two spaced apart pistons 22 and 23 forming a chamber 24 therebetween which is adapted to be connected to conduit 9 leading from the application line 4 of the tractor braking system. The piston 22 carries a rubber valve element 25 for controlling an exhaust port 26 in the top end of the casing. The piston 23 carries a stem 27 on the lower end of which is mounted a valve element 28 for controlling the inlet port 29 in a partition 30 at the lower end of cylinder 21. The lower end of the casing is provided with a cap 31 and this cap forms with the partition 30, a chamber 32 which is connected to the auxiliary reservoir on the trailer by means of a conduit 33.

The pistons 22 and 23 are each provided with friction rings 34 and 35, respectively, which act as damping rings to prevent any rapid oscillations of the pistons which may be caused by rapid variation in pressures on the piston. The piston 22 is also formed with a projecting portion 36 which receives, in a bore 33, the upper end of stem 27 and thus guides the piston in the cylinder. The projection 36 also cooperates with the piston 23 for maintaining the pistons in spaced relation to form the chamber 24 and to also limit the movement of piston 22 during the opening of exhaust port 26.

The casing 15 at the side of cylinder 20 is formed with a passage 38 which communicates with the upper end of the cylinder 21 above piston 22 by means of passage 39. Passage 38 also communicates with the portion of the cylinder below the piston 23 and above the partition 30 by means of a cross-passage 40 in the casing and a passage 41 in the piston. Passage 40 extends to the exterior of the valve casing at the surface 17. The casing 15 at its upper end is provided with a bore 42 which intersects passage 39 and the ends of this bore are closed by plugs 43 and 44 (Figure 2). A passage 45 connects the chamber 32 in the lower end of casing 15 with the exterior of the casing at the surface 17.

The casing 16 containing the emergency valve mechanism is formed with a central stepped bore 46 and within the upper end thereof is a piston 47 carrying a downwardly extending stem 48. In the bore 46 below piston 47 are mounted two spaced apart valve seats 49 and 50 acting as partitions and which are adapted to cooperate with a valve element 51 carried on the stem 48. The lower end of bore 46 is also formed by valve seat 52 and cooperating with this seat is a valve element 53 guided on the lower end of the valve stem and biased onto its seat by a spring 54 interposed between the valve element and a perforated sleeve 55 on the stem. The lower end of the bore below the valve seat 52 is connected by a passage 56 with conduit 10 leading from the main reservoir on the tractor.

The piston 47 is adapted to have a loose fit in the upper end of the stepped bore and in order to seal this piston from the chamber 57, above said piston there is provided a free diaphragm 58, the peripheral edge of which cooperates with an annular surface of the casing and is held in sealing engagement therewith by a spring 59 interposed between a disk 60 and a cap 61 forming a closure for the chamber 57. The chamber 57 is connected by a passage 62 (Figure 5) with the lower end of the stepped bore on the valve seat 52. Since the lower end of this bore is in constant communication with the main reservoir tank through conduit 10, chamber 57 will also be in constant communication with the main reservoir.

The casing 16 is provided with a passage 63 which connects the upper end of the stepped bore 46 above valve seat 49 and below the piston 47 with the exterior of the casing at a point on surface 18. A passage 64 also connects this same portion of the bore with the exterior at a point on the opposite side of the casing and, as is shown, this passage is closed by plug 65. The lower end of casing 16 is provided with a cross-passage 66 which intersects the lower end of the stepped bore 46 above the valve seat 52. This passage has one of its open ends at the exterior surface 18 and its opposite open end closed by a plug 67. The portion of the stepped bore 46 between valve seats 49 and 50 is connected to outlet passages 68 and 69, the former being connected to conduit 13 and the latter to conduit 14 of the trailer brake actuating cylinders 12.

When the two casings 15 and 16 are bolted together so the cooperating flat surfaces 17 and 18 engage each other, the open end of passage 63 in casing 16 coincides with the open end of passage 40 in the casing 15, thus placing these two passages in direct communication with each other. Also, the passage 66 in casing 16 will directly communicate with passage 45 in casing 15.

When the tractor and trailer brakes are in their released position, control valve 5 will be in its exhausted position. Under these conditions piston 22 of the relay valve will be in its lower-most position where valve 25 carried thereby will open the exhaust port 26. Assuming that the compressor has built up a predetermined pressure of say one hundred pounds per square inch in the main reservoir 2 on the tractor, there will also be substantially the same pressure in the trailer reservoir since the trailer reservoir is charged directly from the main reservoir through pipe 10, valve 53, passage 66, passage 45, chamber 32 and conduit 33. Chamber 57 in the top of casing 16 will also be supplied with fluid under pressure equal to that of the main reservoir since such chamber is directly connected to the main reservoir by the passage 62. The fluid pressure in chamber 57 will maintain piston 47 in the position shown in Figure 3 where valve element 51 will be seated on seat 50. Passage 63 will thus be in free communication with conduits 14 and 15 leading to the trailer brake power cylinders. Since the pressure acting downwardly on piston 47 is greater than the pressure acting upwardly on valve element 51, the valve element will always be firmly seated.

If it is now desired to apply the brakes of the tractor and trailer, the main control valve 5 is moved to a position to admit air from the main reservoir into conduit 4 leading to the tractor power cylinders 3 and conduit 9 leading to the trailer. Since conduit 9 is connected to chamber 24 between the two pistons 22 and 23, fluid under pressure admitted to this chamber will first cause the piston 22 to move to its upper position, as shown in Figure 3, thereby closing the exhaust port 26. As the fluid pressure in chamber 24 increases, piston 23 will be forced downwardly, opening valve 28 and permitting fluid under pressure from the trailer tank to pass through inlet 29, passages 40 and 63, past valve seat 49 and into conduits 13 and 14 leading to the trailer power cylinders, thereby applying the trailer brakes. As soon as the total pressure acting on the lower surface of piston 23 becomes slightly greater than the fluid pressure acting on the upper part, piston 23 will be moved upwardly, thereby reseating valve 28 and preventing any more air under pressure from being admitted to the trailer brake cylinders in the manner already described. If it is desired to apply the brakes with greater force, additional fluid pressure is admitted to the tractor power cylinders by means of the main control valve 5. This additional pressure is also effective upon the upper surface of piston 23 and consequently this piston will be again moved downwardly to open valve 28 and admit more pressure to the trailer brake power cylinders.

When it is desired to release the brakes, the main control valve 5 of the tractor is moved to released position, thereby exhausting the fluid under pressure from conduits 4 and 9. This will cause a drop in pressure in chamber 24 and as a result thereof, piston 22 will be forced downwardly and open exhaust port 26. Since the chamber above piston 22 is in constant communication with the trailer brake power cylinders, air under pressure in the power cylinders will be quickly released.

It is to be noted that only a small drop in pressure in chamber 24 is necessary to cause exhaust valve 25 to open. When the brakes are applied, the fluid pressure acting upon the top surface of piston 22 is substantially the same as that acting upon the lower surface of this piston. However, the effective area of the upper surface of the piston which is acted upon by the fluid pressure is slightly less than the effective area of the lower surface and because of this differential, the exhaust valve will be held seated with the piston in its upper position. A slight drop in pressure in chamber 24 will quickly cause the pressure acting upon the upper surface of piston 22 to become greater than the pressure acting on the lower surface of this piston and, consequently, the piston will be moved downwardly.

The friction rings 34 and 35 on pistons 22 and 23 are very effective in preventing any rapid oscillations of these pistons. The friction ring 34 on piston 22 prevents what is commonly known as "snorting" of the exhaust valve when the brakes are allowed to be released. When the exhaust valve is initially opened, there is a quick drop in pressure in the chamber above the piston. Since there is still pressure acting upon the lower side of piston 22, this quick drop will cause a reseating of valve 25. The reseating, however, will only be momentary for as soon as the exhaust port becomes closed, the pressure on the upper surface of the piston is again built up, thereby forcing the valve away from the seat. The friction ring 34 sets up a resistance to the oscillation of the exhaust valve element on its seat, thus eliminating the cause of the "snorting". Similarly the friction ring 35 on the lower piston prevents any undesirable oscillation of this piston during the application of the brakes. When valve 28 is initially unseated, the in-rush of air into the space below piston 23 will not cause a quick reseating of the valve since the friction ring will produce a drag on the piston and prevent it from moving to a position where the valve is closed.

In the event the trailer should become uncoupled from the tractor, lines 9 and 10 between the tractor and trailer will become severed. The breaking of line 10 will immediately cause a rapid drop in pressure in chamber 57 of the emergency valve mechanism. The trailer reservoir, however, will not lose any pressure since valve 53 will remain seated. The drop in pressure in chamber 57 will permit spring 54 to move valve stem 48 and piston 47 upwardly and cause valve element 51 to become disengaged from seat 50 and engaged with seat 49. Under these conditions, passage 63 will be closed off from conduits 13 and 14 leading to the brake cylinders and conduits 13 and 14 connected to passage 66 in the lower end of the stepped bore 46 and above valve 53. This will result in the trailer reservoir being connected directly to the trailer brake power cylinders and the full pressure of the fluid under pressure in said reservoir will be effective to apply the trailer brakes to immediately stop the trailer. When the trailer is again connected with the tractor, fluid under pressure will be re-established in chamber 57, thereby causing the piston 47 to be moved downwardly whereby the valve element 51 will become disengaged from valve seat 49 and re-engaged with valve seat 50. The valve will thus be in a position to permit application and release of the brakes by operation of the main control valve 5 in a manner already described.

When piston 47 is moved to its upward position as a result of a sudden drop in pressure in chamber 57, the entire diaphragm will be moved upwardly and the peripheral edge thereof will be freed from the annular surface of the casing. There is very little flexing of the diaphragm during the upward movement of the piston as would be the case if the diaphragm were tightly clamped at its edges. No sealing function is necessary for the diaphragm when the piston is in its upper position as there is no air under pressure below the piston. Consequently, there is no disadvantage in having the sealing edges of the diaphragm disengaged from the annular surface of the casing. By so constructing the sealing diaphragm that there is little flexing thereof when the piston is moved, the life of the diaphragm will be greatly increased. This is especially true in cold weather where the flexibility of the diaphragm is greatly decreased and if flexed under these conditions, cracking or breakage may result. By also having piston 47 loosely fitted in the top of the bore, the friction between the piston and wall is a minimum.

An important feature of my invention is the separability of the two casings whereby the emergency valve mechanism 8 may be used on the trailer vehicle independently of the relay valve mechanism 7 or the relay valve mechanism used independently of the emergency valve mechanism.

Referring to Figure 6, I have shown how the relay valve mechanism 7 is incorporated in the trailer braking system when used alone. In order to adapt the valve mechanism for its independent use, passages 41 and 45 are closed by means of a plate 70 which is clamped to the surface 17 by means of bolts 71, these bolts being positioned in the same hole in which the attaching bolts 19 are positioned. The conduit 9' leading from the tractor brake application line is connected to chamber 24 of the valve mechanism in the same manner as shown in Figure 1. The conduit 10' or the emergency line leading from the main reservoir on the tractor is connected directly to the reservoir 11' and the latter is connected to chamber 32 in the lower ends of the valve mechanism by conduit 33'. The closure plugs 43 and 44 at the ends of passage 42 are removed and conduits 13' and 14' leading to the power cylinders of the trailer brakes are connected to passage 42.

The operation of the relay valve is the same as already described. When fluid under pressure is admitted to chamber 24, exhaust valve 25 will be seated and valve 28 will be unseated to permit fluid under pressure from the trailer reservoir to pass to the power cylinders of the trailer brakes by way of passages 41, 40, 38 and 42 and the conduits 13' and 14'. The release of the fluid pressure on the tractor brakes will cause a drop in pressure in chamber 24 of the valve mechanism and permit the exhaust valve 25 to be unseated to release the trailer brakes in a manner already described.

Referring to Figure 7, when it is desired to use the emergency valve mechanism 8 alone on the trailer brake system, passages 63 and 66 are closed by means of a plate 72 clamped to surface 18 by means of bolts 73 which also may act as the means for mounting the valve mechanism. The plug 65 for closing passage 64 is removed and conduit 9" leading from the tractor braking system is connected to passage 64. The plug 67 is also removed and conduit 33'' leading from the trailer reservoir 11'' is connected to passage 66. The emergency line 10'' is connected to passage 56 at the lower end of the valve casing in the same manner as shown in Figure 1. The conduits 13'' and 14'' leading to the trailer power cylinders are connected in the same manner as shown in Figure 1.

With the valve mechanism connected in the manner just described, the trailer reservoir 11'' will be charged with the same pressure as the main reservoir on the tractor, fluid being free to flow past the valve 53. This same pressure will also be present in chamber 57 at the top of the valve and will move the piston downwardly to the position shown in Figure 3 where conduit 9'' will be connected directly with conduits 13'' and 14'' leading to the power cylinders of the trailer brakes.

When the main application valve on the tractor is operated to admit pressure into the tractor brake system, fluid under pressure will be free to pass through the emergency valve mechanism to the trailer brake power cylinders to apply the trailer brakes. In the event the trailer should become uncoupled, conduit 10'' will be severed, thereby causing a drop in pressure in chamber 57 of the valve. The spring 54 of the valve will now become effective to move the piston and valve 51 upwardly to a position where the valve engages seat 49 and becomes disengaged from seat 50. The trailer reservoir 11'' is connected directly to the power cylinders of the trailer brakes, thereby causing the brakes to be applied and bringing the trailer to a stop. When the trailer is again connected, the parts of the valve mechanism will assume their normal positions, as shown in Figure 3, and the trailer brakes may again be applied and released by the main control valve on the tractor.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure brake system for the trailer of a tractor-trailer vehicle, the combination with the tractor brake application line, the emergency line, the trailer reservoir and the trailer brake applying power cylinder, of a combined relay valve mechanism and an emergency valve mechanism on the trailer for controlling the trailer brakes, said relay valve mechanism being embodied in a casing having a flat surface and comprising a valve element controlled by the fluid pressure in the application line for connecting the trailer reservoir to the trailer power cylinder, said emergency valve mechanism being embodied in a second casing provided with a flat surface for cooperation with the flat surface of the first casing and comprising a valve under the control of the fluid pressure in the emergency line for selectively connecting the reservoir to the power cylinder through the relay valve mechanism or directly to the power cylinder, each of said valve casings having two passages which extend to its flat surface, the passages being so arranged that each passage in one casing will communicate with another passage in the other casing, means for removably securing the casings together with the flat surfaces in cooperative relation, said valve casings also being provided with other conduits leading to the surfaces other than the flat surfaces, and removable means for closing said conduits when the casings are connected together, said valve mechanisms being capable of independent use by disconnecting the casings at their flat surfaces, closing the said passages which extend to the flat surfaces by the application of the sealing plates to the said flat surfaces and connecting the closed conduits to certain conduits of the brake system.

2. In a fluid pressure brake system for the trailer of a tractor-trailer vehicle, the combination with the tractor brake application line, the trailer brake applying power cylinder and the trailer reservoir receiving fluid under pressure from the emergency line, of a relay valve mechanism for controlling the flow of fluid under pressure from the trailer reservoir only to the power cylinder and comprising a casing having an exhaust port, an inlet port connected to the reservoir and an outlet port connected to the power cylinder, a valve element for the exhaust port, a valve element for the inlet port, oppositely movable pistons in said casing for controlling the valve elements, said pistons forming with the casing a fluid-tight chamber therebetween in all positions of the pistons, means for placing the chamber in communication with the application line whereby said pistons may be operated by differential pressure, and friction rings carried by the pistons and cooperating with the walls of the casing for preventing rapid oscillation of the pistons under the influence of rapid changes in differential pressures.

3. In a fluid pressure brake system for the trailer of a tractor-trailer vehicle, the combination with a tractor brake application line, a trailer brake applying power cylinder and a trailer reservoir receiving fluid under pressure from the emergency line, of a relay valve mechanism for use either in combination with an emergency valve mechanism or independently thereof, said valve mechanism comprising a casing having a flat external surface for attachment to the emergency valve mechanism when used in combination therewith, said casing also being provided with an exhaust port, an inlet port adapted to be connected to the reservoir and two outlet ports each of which is adapted to be connected to the power cylinder, one of said outlet ports extending to the exterior of the casing at the flat surface and being the outlet to the power cylinder when the relay valve mechanism is used with the emergency valve mechanism and said other outlet port being the outlet to the power cylinder when the relay valve mechanism is used independently, removable means for closing the last named of said outlet ports when the other is being employed, a plate associated with the flat surface for closing the first named outlet port when the valve is used independently, valve elements in the casing for the exhaust port and the inlet port, and oppositely movable members in said casing for controlling the valve elements and connected to be operable by fluid pressure in the application line.

4. In a fluid pressure brake system for the trailer of a tractor-trailer vehicle, the combination with a tractor brake application line, a trailer brake applying power cylinder and a trailer reservoir receiving fluid under pressure from the emergency line, of an emergency valve mechanism comprising a casing provided with conduit means for connecting the application line with the power cylinder and with other conduit means for connecting the reservoir with the power cylinder, opposed valve seats associated with the two conduit means, a single valve element positioned between the valve seats for selectively closing said two conduit means, a movable element for controlling said valve element, means operable by fluid under pressure from the emergency line for causing said movable element to assume a position wherein the valve element closes the conduit means between the reservoir and the power cylinder, and means causing said valve element to assume a position closing the conduit means between the application line and the power cylinder in the event of a drop in pressure in the emergency line.

5. In a fluid pressure brake system for the trailer of a tractor-trailer vehicle, the combination with a tractor brake application line, a trailer brake applying power cylinder and a trailer reservoir receiving fluid under pressure from the emergency line, of an emergency valve mechanism comprising a casing provided with conduit means for connecting the application line with the power cylinder and with other conduit means for connecting the reservoir with the power cylinder, opposed valve seats associated with the two conduit means, a valve stem, a single valve element secured to the stem and positioned between the valve seats for selectively closing said two conduit means, a chamber connected to the emergency line, a piston in said chamber secured to the stem and subject to the fluid pressure in the chamber to cause said valve element to close the conduit means between the reservoir and the power cylinder, and means for moving the valve element to close the conduit means between the application line and the power cylinder in the event of a drop in pressure in the chamber.

6. In a fluid pressure brake system for the trailer of a tractor-trailer vehicle, the combination with a tractor brake application line, a trailer brake applying power cylinder and a reservoir receiving fluid under pressure from the emergency line, of an emergency valve mechanism for use either in combination with a relay valve mechanism or independently thereof, said valve mechanism comprising a casing having a flat external surface for attachment to the relay valve mechanism when used in combination therewith, said casing also being provided with a port for connection with the emergency line, an outlet port for connection with the power cylinder and two inlet ports either of which is adapted to be connected to the application line, one of said inlet ports extending to the exterior of the casing at the flat surface and being the inlet to the casing when the emergency valve mechanism is used with the relay valve mechanism and said other inlet port being the inlet to the valve casing when the emergency valve mechanism is used independently, said casing also being provided with two ports which are adapted to be connected with the reservoir, one of said latter ports extending to the exterior of the casing at the flat surface and being the one employed when the emergency valve mechanism is used with the relay valve mechanism and the other of said ports being the one employed when the emergency valve mechanism is used independently, means for closing the two ports which extend to such surface when the said valve mechanism is used independently, means for closing the other inlet port and the reservoir port when the said valve is used with the relay valve mechanism, and means including valve means in the casing and controlled by fluid under pressure from the emergency line for selectively connecting the inlet ports to the power cylinder or the reservoir ports to the power cylinder.

7. In a valve assembly, a casing, a valve stem, a valve element on said stem, means forming a chamber in said casing and a cylinder opening into the chamber, a piston loosely fitted in the cylindrical portion and secured to the valve stem to control the valve, said piston having a head surface which is adapted to be either flush with or below the adjacent wall of the chamber when the piston is in one position and when in another position to project into the chamber, a diaphragm overlying the piston head surface and the wall of the chamber adjacent thereto, a plate for said diaphragm and overlying the portion of the diaphragm above the periphery of the head surface of the piston and the chamber wall adjacent thereto, and a spring acting on the plate, said piston when moved to a position projecting into the chamber bodily moving the diaphragm away from the chamber wall.

WERNER F. BOLDT.